United States Patent Office 2,715,092
Patented Aug. 9, 1955

2,715,092

ORGANIC PENICILLIN SALT SOLUTIONS AND METHOD OF MAKING SAME

Henry H. Penau and Guy Hagemann, Paris, France, assignors to Les Laboratoires Francais de Chimiotherapie, Paris, France, a body corporate of France No Drawing. Application April 1, 1952,
Serial No. 279,958

Claims priority, application France April 6, 1951

7 Claims. (Cl. 167—65)

The present invention relates to new organic penicillin compounds and more particularly to a method for the preparation of solutions of said compounds, said compounds and their solutions possessing an anti-bacterial effect of such duration as none of the conventional compounds and preparations displays.

It is an object of the present invention to provide new organic penicillin compounds and methods for the preparation of their solutions, wherein these compounds and their solutions have the attributes of prolonged bacteriostatic efficacy and the solutions of said new organic penicillin compounds are particularly adapted for use for painless and efficient parenteral and intramuscular administration.

It is a further object of the present invention to provide penicillin compounds of increased bacteriostatic efficacy, adapted to form solutions rather than suspensions, said compounds remaining for a certain time in perfect and complete solution in vitro, prior to administration, but crystallizing substantially immediately in vivo, upon injection.

In copending application Serial No. 156,228, filed April 15, 1950, entitled "New Organic Penicillin Salt Solutions Having a Delayed Action and Process for Making Same," a method of preparing a therapeutically active injectable penicillin salt solution is described which comprises the steps of dissolving a soluble penicillin salt, for instance, penicillin sodium or potassium, in a suitable solvent, such as propylene glycol to which water has been added, and which contains dissolved therein a salt of an organic base, such as quinine formate.

The mixture obtained thereby has the property of maintaining said reactive product in solution in vitro during the time necessary for injection whereby the solvent employed, especially the propylene glycol, has a stabilizing effect. When injecting said preparation, the reaction product between the penicillin salt and the organic base, such as the penicillin-quinine salt, is deposited in the human tissue, i. e., in vivo, and is absorbed by the human system over a considerably prolonged period of time thus producing a considerably prolonged therapeutic effect of said penicillin salt.

Said preparation has the following characteristics and advantages: It will not clog the hypodermic needle being a pseudo-solution in contradistinction to a penicillin suspension as now known, and not an aqueous solution, said aqueous solution having no prolonged effect and, in fact, being unstable. It will permit the use of a hypodermic needle of small diameter and consequent reduction of pain and inconvenience to the patient to whom it is administered. It will precipitate the active ingredients in the muscle or under the skin where they will be slowly absorbed and will exert a prolonged effect.

The present invention represents an improvement of said process and preparation. In principle, it consists in adding a stabilizing agent to the preparation during the course of its preparation. Said stabilizing agent may be added to the solution of the soluble penicillin salt or may be mixed with said penicillin salt prior to the dissolution of the latter. It may also be added to the solution of the organic base compound or may be mixed therewith prior to its dissolution. Especially suitable stabilizing agents are vegetable gums, such as gum arabic, and the polymerisation product obtained from vinyl pyrrolidone, the polyvinyl pyrrolidone. By the addition of said stabilizing agents the stability of the injectable solution is increased considerably permitting the solution to remain stable and without precipitation of the penicillin compound in vitro for a longer period of time than is the case where no stabilizing agent is added.

The administration and use of such a preparation is thus considerably facilitated.

The addition of stabilizing agents, such as gum arabic and polyvinyl pyrrolidone, has proved to be of advantage not only with respect to penicillin compounds such as are mentioned in copending application Serial No. 156,228, especially with the water insoluble penicillin-quinine salt but with other penicillin salts with organic bases and alkaloids. Thus, for instance, the penicillin salts of emetine and of benzhydryl amine, i. e., of amino diphenyl methane may be used as active ingredient of said preparation. The manufacture of the amino diphenyl methane salt of penicillin is described in copending application Serial No. 264,876, filed January 4, 1952, entitled "Penicillin Compound and a Method of Making Same." The emetine salt of penicillin is obtained according to the present invention, for instance, by reacting a penicillin salt and an emetine salt in aqueous solution whereby the water insoluble penicillin emetine salt precipitates. When proceeding according to the present invention and carrying out said reaction in a suitable organic solvent, such as propylene glycol or its mixture with water, preferably in the presence of a stabilizing agent such as polyvinyl pyrrolidone or gum arabic, an injectable preparation is obtained which in vitro, i. e., outside the human body, is a solution but which, after injection in vivo, i. e., in the body, precipitates the insoluble emetine penicillin salt and thus, produces a considerably prolonged effect.

The following examples serve to illustrate the invention, without, however, limiting the same to them.

Example 1

2.5 g. of officinal crystalline emetine chlorohydrate ($C_{29}H_{40}N_2O_4.2HCl.3H_2O$) are dissolved in 100 cc. of distilled water which contains 2 g. of gum arabic as injectable stabilizing agent causing increase in the viscosity of the mixture. The solution obtained is filled into ampoules at the rate of 2 cc. per ampoule, and the ampoules are sterilized. Penicillin in the form of a dry sterile powder of sodium penicillin, is placed into small bottles in an amount corresponding to about 200,000 units per bottle.

Shortly before injection, the content of the ampoule is added to the penicillin powder which is dissolved therein. The combination of penicillin with emetine and the formation of the penicillin-emetine salt takes place gradually and is retarded so that it is maintained in colloidal solution by the stabilizing agent. When injected into a patient intramuscularly, the emetine-penicillin salt precipitates at the point of injection due to dilution with the body fluids. Since the emetine-penicillin salt is only very slightly soluble in water, a prolonged action of the penicillin as well as of the emetine is achieved and their therapeutic effect is very considerably retarded.

Example 2

2.5 g. of officinal crystalline emetine hydrochloride are dissolved in 100 cc. of distilled water which contains, in solution, 20 g. of polyvinyl pyrrolidone as injectable stabilizing agent to increase the viscosity of the mixture. The solution obtained is filled into ampoules at the rate of 2 cc. per ampoule and the ampoules are sterilized. Penicillin, in the form of a dry sterile powder of potassium penicillin, is filled into bottles at the rate of 200,000 units per bottle.

Shortly before injection, the content of the ampoule is added to the penicillin which is dissolved in the emetine solution contained in said ampoule. The emetine-penicillin salt is formed very slowly and does not precipitate immediately but only after injection into the human body, as this is described more in detail in Example 1.

*Example 3*

2.5 g. of officinal crystalline emetine hydrochloride are dissolved in 40 cc. of distilled water. 18 g. of propylene glycol are added to said solution which is then filled up to a volume of 100 cc. by the addition of distilled water. The solution is then filtered and filled into ampoules at the rate of 2 cc. per ampoule and the ampoules are sterilized. Penicillin, in the form of a sterile dry powder of potassium penicillin is also filled into small bottles at the rate of 200,000 units per bottle.

Shortly before injection, the penicillin is dissolved by the addition of the solution contained in said ampoules. The formation of the insoluble penicillin-emetine salt takes place at such a slow rate that precipitation occurs only after intramuscular injection of the mixture at the point of injection.

*Example 4*

6.5 g. of the crystalline chlorohydrate of amino diphenyl methane ($C_{13}H_{13}N.HCl$) are dissolved in 40 cc. of distilled water. To said solution an amount of propylene glycol as stabilizing agent is added that is sufficient to adjust the volume of the solution to 100 cc. The homogeneous solution is then filtered, filled into ampoules at the rate of 3 cc. per ampoule and the ampoules are sterilized. These ampoules represent the solvent used for dissolving penicillin before injection. Penicillin, in the form of a dry sterile powder of sodium penicillin, is filled into bottles at the rate of 500,000 units per bottle.

Shortly before injection, the content of said ampoule is added to the penicillin in such bottle and the penicillin is dissolved therein. On intramuscular injection of said penicillin solution, a crystalline precipitate of the penicillin salt of amino diphenyl methane is formed at the place of injection, said salt being very slightly soluble in water and in blood serum and, therefore, producing a prolonged penicillin effect. This penicillin salt of amino diphenyl methane has the advantage over the penicillin-quinine salt described in the above mentioned copending application Serial No. 156,228, that its molecular weight is lower and that, therefore, more concentrated solutions with respect to their content of units of penicillin are obtainable.

Of course, the invention is not limited to the examples given above. Other soluble penicillin salts, such as the ammonium salt, the calcium salt, the triethylamine salt and more generally the trialkylamine salts and others may be used in place of the sodium and potassium salts employed in the examples. The preferred penicillin compound is the penicillin G, but also other penicillin compounds are suitable for the purpose of this invention such as penicillin F, penicillin X, penicillin K, penicillin dihydro F or mixtures of the same. Likewise, in place of the chlorohydrates of emetine and amino diphenyl methane other salts of said bases can be employed such as the sulfates, the phosphates, the formates and others.

As is evident from the examples propylene glycol and mixtures of propylene glycol with water are suitable solvents capable of retarding precipitation of the difficultly soluble penicillin compounds. Said propylene glycol is substituted, according to another feature of this invention, by aqueous solutions of polyvinyl pyrrolidone or gum arabic.

In place of polyvinyl pyrrolidone and gum arabic, other agents capable of increasing the viscosity of the penicillin preparation so as to furthermore retard the precipitation of the difficultly soluble penicillin salts formed with organic bases may be used. Such viscosity increasing, precipitation retarding, and stabilizing agent is, for instance, the carboxymethylcellulose.

When referring to a hypodermic needle of small diameter in the specification, we refer to an internal diameter of the syringe needle ranging from 0.6 mm. to 0.8 mm.

We claim:

1. An injectable therapeutic preparation for treating bacterial infections, comprising an aqueous solution of emetine hydrochloride, an equimolecular amount of sodium penicillin, and about 2% of gum arabic, dissolved in said solution, said solution retaining the reactive product of said emetine salt and said pencillin salt in solution in vitro only for a period of time sufficient to administer said preparation by injection, the amounts of said emetine salt and said penicillin salt in said solution being adjusted so that the penicillin concentration in said preparation is not less than about 100,000 units per cc., the sodium penicillin being dissolved in the emetine hydrochloride solution directly before injection.

2. An injectable therapeutic preparation for treating bacterial infections, comprising an aqueous solution of emetine hydrochloride, an equimolecular amount of sodium pencillin and about 20% of polyvinyl pyrrolidone dissolved therein, said solution retaining the reactive product of said emetine salt and said penicillin salt in solution in vitro only for a period of time sufficient to administer said preparation by injection, the amounts of said emetine salt and said penicillin salt in said solution being adjusted so that the penicillin concentration is not less than about 100,000 units per cc., the sodium penicillin being dissolved in the emetine hydrochloride solution directly before injection.

3. An injectable therapeutic preparation for treating bacterial infections, comprising an aqueous solution of emetine hydrochloride, an equimolecular amount of sodium penicillin and about 20% of propylene glycol dissolved therein, said solution retaining the reactive product of said emetine salt and said penicillin salt in solution in vitro only for a period of time sufficient to administer said preparation by injection, the amounts of said emetine salt and said penicillin salt in said solution beng adjusted so that the penicillin concentration in said preparation is not less than about 100,000 units per cc., the sodium penicillin being dissolved in the emetine hydrochloride solution directly before injection.

4. An injectable therapeutic preparation for treating bacterial infections, comprising an aqueous solution of amino diphenyl methane hydrochloride, an equimolecular amount of sodium penicillin and about 60% of propylene glycol dissolved therein, said solution retaining the reactive product of said amino diphenyl methane salt and said penicillin salt in solution in vitro only for a period of time sufficient to administer said preparation by injection, the amounts of said amino diphenyl methane salt and said penicillin salt in said solution being adjusted so that the penicillin concentration in said preparation is not less than about 100,000 units per cc., the sodium penicillin being dissolved in the amino diphenyl methane hydrochloride solution directly before injection.

5. An injectable therapeutic preparation for treating bacterial infections, comprising an aqueous solution of an acid addition salt of an organic base selected from the group consisting of emetine and amino diphenyl methane and an equimolecular amount of a water soluble penicillin salt, said solution containing a water soluble stabilizing agent selected from the group consisting of gum arabic, polyvinyl pyrrolidone, and propylene glycol, said penicillin salt being dissolved in said solution shortly before injection, said solution retaining the reactive product of the acid addition salt of said base and said penicillin salt in solution in vitro only for a period of time sufficient to administer said preparation by injection, the amounts of the acid addition salt of said base and of said penicillin salt in said solution being adjusted so that the penicillin concentration in said preparation is not less than about 100,000 units per cc.

6. An injectable therapeutic preparation for treating bacterial infections, comprising an aqueous solution of an acid addition salt of an organic base selected from the group consisting of emetine and amino diphenyl methane and an equimolecular amount of a water soluble penicillin salt, said solution containing between about 13% and about 60% of propylene glycol, said penicillin salt being dissolved in said solution shortly before injection, said solution retaining the reactive product of the acid addition salt of said base and of said penicillin salt in solution in vitro only for a period of time sufficient to administer said preparation by injection, the amounts of the acid addition salt of said base and of said penicillin salt in said solution being adjusted so that the penicillin concentration in said preparation is not less than about 100,000 units per cc.

7. In the process of combatting bacterial infections by administering to a patient a predetermined dose of an injectable penicillin preparation of prolonged activity, said penicillin preparation being administered shortly after its preparation, the steps comprising adding, shortly before injection, a water soluble salt of penicillin to an aqueous solution of an equimolecular amount of an acid addition salt of an organic base selected from the group consisting of emetine and amino diphenyl methane, said solution containing a water soluble stabilizing agent selected from the group consisting of gum arabic, polyvinyl pyrrolidone, and propylene glycol, the resulting injectable preparation retaining the reactive product of said acid addition salt and said penicillin salt in solution in vitro for a period of time sufficient to administer said preparation by injection, the amounts of the acid addition salt of said base and of said penicillin salt in said preparation being adjusted so that the penicillin concentration in said preparation is not less than about 100,000 units per cc.

References Cited in the file of this patent

UNITED STATES PATENTS

| | | |
|---|---|---|
| 2,467,583 | Cosar | Apr. 19, 1949 |
| 2,491,537 | Welch | Dec. 20, 1949 |
| 2,578,536 | Granatek | Dec. 11, 1951 |
| 2,600,344 | Van Meter | June 10, 1952 |

FOREIGN PATENTS

| | | |
|---|---|---|
| 970,448 | France | Jan. 4, 1951 |
| 471,147 | Canada | Jan. 30, 1951 |
| 658,467 | Great Britain | Oct. 10, 1951 |

OTHER REFERENCES

Noguer-More, "La penicilline-retard en solution aqueuse," La Presse Medicale, Aug. 13, 1949, No. 52, p. 748.

Mfg. Chemist, Oct. 1951, pp. 398–402, esp. at p. 400, column 1, first complete paragraph.